United States Patent

[11] 3,559,767

| [72] | Inventor | Rene Gervais<br>Santeny, France |
|---|---|---|
| [21] | Appl. No. | 814,956 |
| [22] | Filed | Apr. 10, 1969 |
| [45] | Patented | Feb. 2, 1971 |
| [73] | Assignee | Welding Research, Inc.<br>Chicago, Ill.<br>a corporation of Illinois |
| [32] | Priority | May 20, 1968 |
| [33] | | France |
| [31] | | P.V. 152530 |

[54] DEVICE FOR POSITIONING OF PARTS ON A WORK STATION
4 Claims, 10 Drawing Figs.

[52] U.S. Cl. ..................................................... 187/1
[51] Int. Cl. ......................................................... B66b 9/00
[50] Field of Search............................................ 187/1;
214/(Inquired); 74/(Inquired); 29/(Inquired);
254/(Inquired)

[56] No references cited.

*Primary Examiner*—Harvey C. Hornsby
*Attorney*—Julius L. Solomon

ABSTRACT: A device for raising and lowering a work piece from conveyor to work station which consists of a planetary gear system with crank arrangement which describes an epicycloidal path and in which the crank drives a push rod and second crank and rod system to lift the platen holding the work pieces so that the speed of the platen is reduced at the critical points in its motion where the parts are picked up and returned to the conveyor and where they are placed in the working position.

INVENTOR.
RENÉ GERVAIS

INVENTOR.
RENÉ GERVAIS
BY Julius L. Solomon

DEVICE FOR POSITIONING OF PARTS ON A WORK STATION

SPECIFICATION

Mass production facilities, such as those which assemble automotive bodies or home appliance chassis, use conveyor lines to perform the different operations. The basic parts are assembled at the start of the conveyor on carriages or directly on rails. Subsequently they advance from one work station to another. A different operation, such as stamping, bending, welding, is performed at each of the several work stations. Whenever a part arrives at a new work station, a device, i.e., a lifting device, brings it up to the desired work level. Various systems are used in order to achieve rapid positioning of the work piece. Particularly well-known is a system using the push rod and crank principle. When this system reaches its dead center point it has the advantage of locking itself into position. The disadvantage of this device is that the law of motion is imposed by its principle, namely a sinusoidal law. As a consequence of the sinusoidal motion the platen of the lifting device is moving at a relatively high speed when it comes in contact with the workpiece and it is difficult not to deform the part inasmuch as very often the workpiece consists of thin gauge material. It is also difficult to hold the part in the proper position. The same applies to the downward motion.

The principal object of the present invention is to avoid these disadvantages. This invention covers a device for the positioning of a workpiece on a work station, consisting of a pinion type assembly which moves the workpiece by means of a pin and arm assembly. This pinion, crank pin and arm assembly is designed to reduce the movement of the workpiece to a desired speed when it enters into contact with the mechanical parts of the machine, which allows the correct positioning of the part on the machine without warping or deforming the workpiece.

Another feature of the invention is that the pinion, crank pin and arm assembly is so designed that the movement of the part to be positioned is reduced to the desired speed when the assembly enters into contact with the part and when, the operation finished, it places the part back on the conveyor.

The invention covers also the machines equipped with a positioning device for workpieces which is the same, or similar to the one described in the invention.

A device conforming to the invention is shown as a nonlimiting example on the attached drawings in which.

Figure 10:
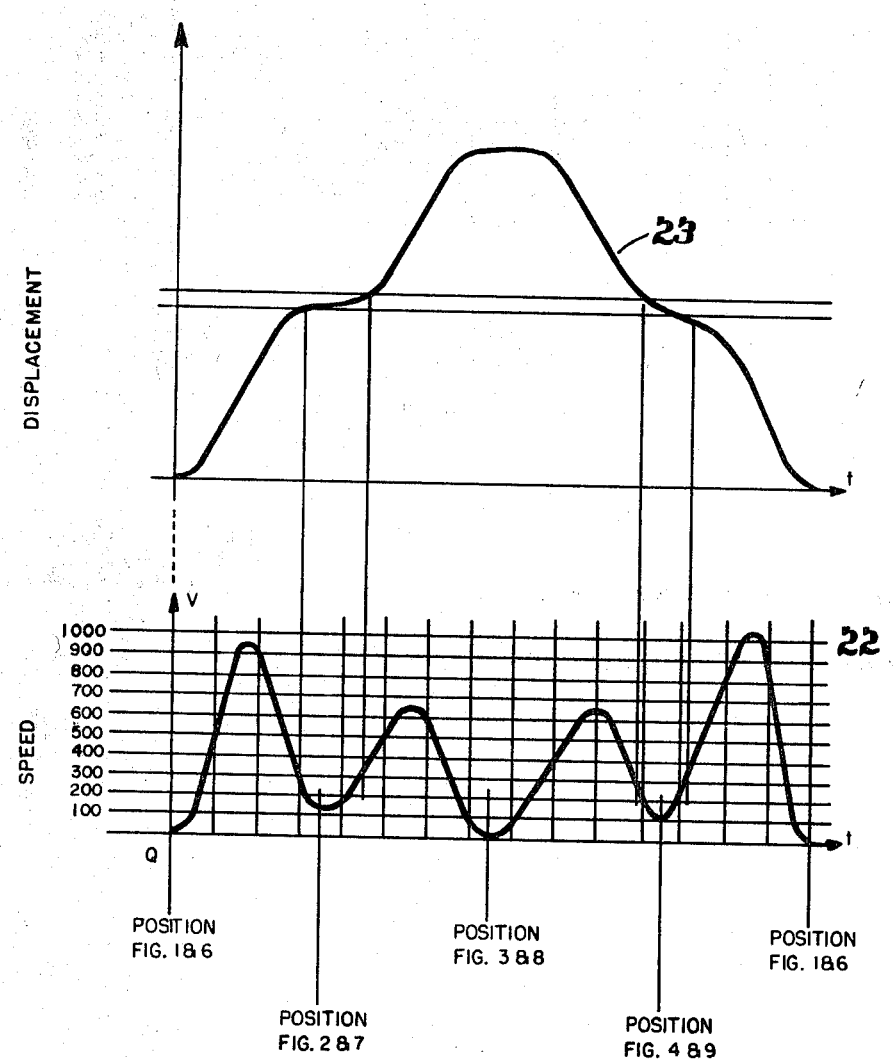

The graph FIG. 10 shows the curves of relative position and speed as a function of time of a workpiece during a cycle of operation.

Consequently the present invention intends to reduce the speed of a workpiece whenever the latter touches any kind of mechanical device such as a supporting device or tooling, in order to avoid brutal shocks to the workpiece which might lead to either an undesired displacement of the piece on its support or in relation to the tooling, or a deformation or warping of the piece which would render it useless.

The machine covered by this invention may, for instance, be a welding machine, but it is evident that any kind of work can be performed with the help of a device as per this invention.

Figure 1:
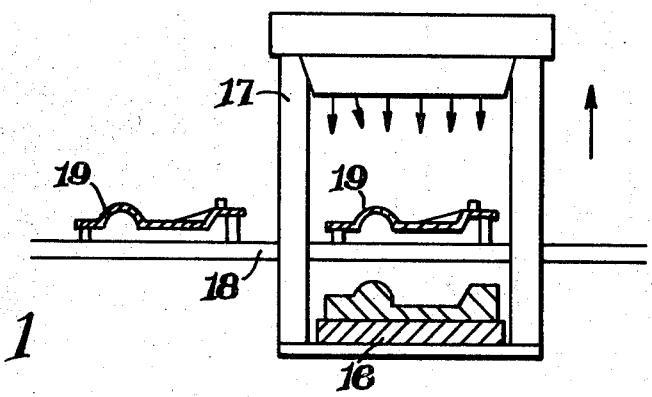
FIGS. 1 through 4 show successively, in different operational stages, a machine controlled by a positioning device as per the present invention.

In the present description, this device takes the shape of a lifting device, as illustrated in FIG. 1, including a frame 17 in which a platen 16 moves vertically.

A transfer device 18 introduces a workpiece 19 into the inside of the machine when the platen 16 is in its lower position. (FIG. 1).

Figures 2, 3:
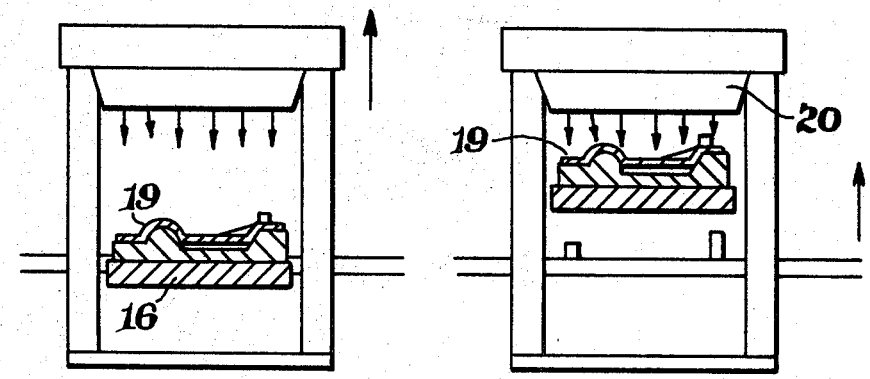

When the platen 16 moves upwards (FIG. 2) it touches the part 19 at a reduced speed, and brings it to the upper position (FIG. 3). This is the work position in which the part 19 touches the tooling 20 mounted on the upper part of the frame.

Figure 4:
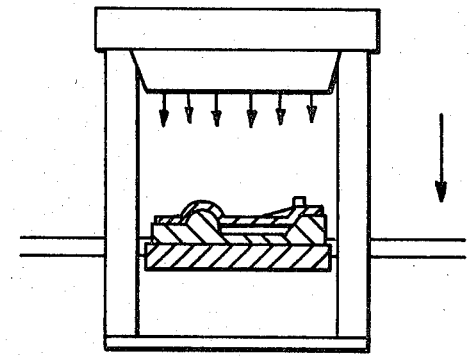

After the work operation has been performed the platen moves downward and places the part, at reduced speed, on the conveyor (FIG. 4). The platen continues to move downward and reaches its lower position (FIG. 1). The finished part is then moved to the right by the conveyor and a new part is introduced into the machine.

Figure 5:
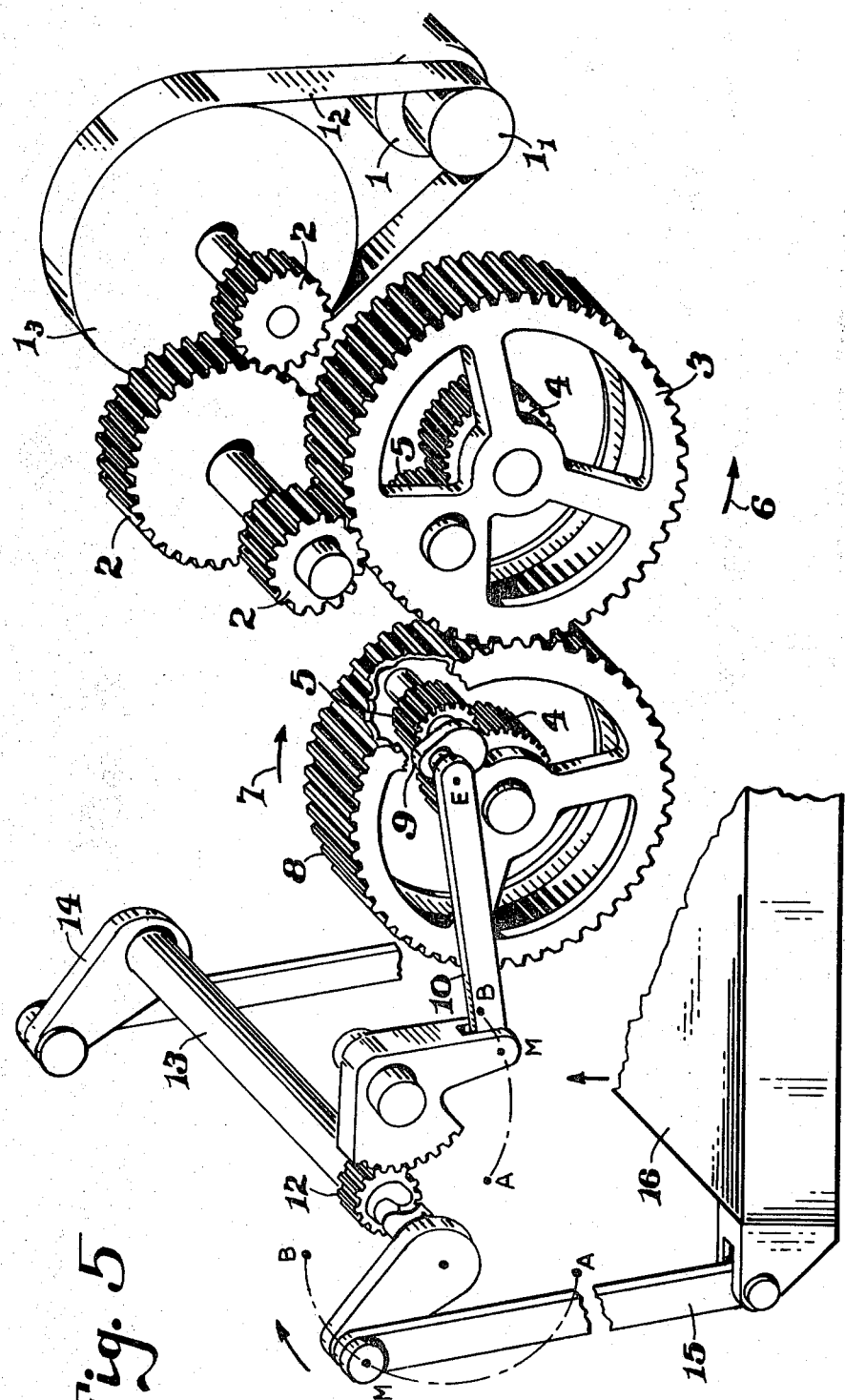
FIG. 5 represents a partial view of a positioning device for a workpiece as per the present invention.
Figure 6:
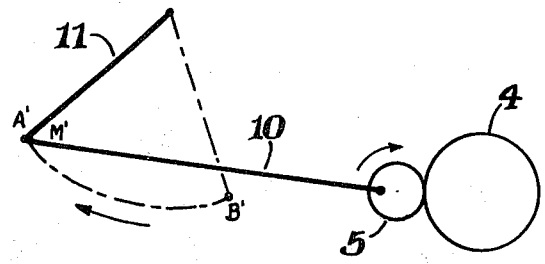
FIGS. 6 through 9 show a schematic view of the device shown in FIG. 5 in different operating positions.

The means used to obtain a speed reduction at the desired moment is shown on FIG. 5.

The motor 1 drives, through a pulley $1_1$, a belt $1_2$ and a coupling and brake flywheel $1_3$, a series of pinions 2, the last of which drives a cogwheel 3.

This cogwheel is hollow in order to be able to revolve around a fixed pinion located on the same shaft as the cogwheel 3.

A satellite pinion 5 is supported by a bearing joined to the part $3_1$ of the cogwheel 3, and moves around the fixed pinion 4.

A second cogwheel 8, identical to the wheel 3, engages into the cogwheel 3. Wheel 3 turns in the direction of the arrow 6, whereas the second wheel, 8, turns in the opposite direction, indicated by arrow 7. On wheel 8 is also shown a pinion 5, but on this wheel the drawing has been completed to show the crank pin 9 fixed on the shaft of the satellite pinion 5.

The radius of the circular path described by the center of the crankpin around the centerline of the pinion 5 is indicated by $e$.

The push rod 10 is driven by this crankpin and transmits its movement to a geared sector 11 which grips into a pinion 12 fixed on shaft 13. The latter is supported by bearings which are fixed to the machine frame and not shown in this drawing.

The cranks 14, connected with the ends of the shaft 13, drive the platen 16 of the machine by means of the push rods 15, in a vertical movement. A second crank push rod assembly, identical to the one described above, but not shown here, is driven by wheel 3, to move the other end of platen 16.

FIGS. 6 through 9 show different operational stages of the device shown in FIG. 5.

On these sketches, the point "M," represented by the articulation of the geared sector 11 at the end of arm 10, can move to the two extremities "A" and "B," and the point M, the articulation of the crank 14 on the push rod 15 is shown in this case in the positions A and B (FIG. 5) with the platen 16 being in the lower and in the high position, respectively (FIG. 3).

Thus, when the platen 16 is in the lower position (FIG. 1), the point M of the crank 14 is located in the dead point, A, and the point M (FIG. 6) is in the position A.

In working position (FIG. 3) the point M is located at B at the dead point high position, and the point M is at B (FIG. 6) when the platen 16 is stopped.

Moreover, during the upward movement (FIGS. 2 and 7) and during the downward movement (FIGS. 4 and 9) of the platen 16, the speed of this platen 16 is strongly reduced whenever the platen takes over the workpiece 19 from the conveyor, or places it back onto the conveyor.

This operation becomes evident from the respective position and the rotational direction of the pinions 4 and 5 shown in FIGS. 6 through 9. It is evident that the motion of the platen 16 will depend principally on the diameter of the pinions 4 and 5, whereas the amplitude of the movement depends on the diameter of the pinions 4 and 5 and on the length of the different lever arms formed by the crank pin 9, the geared sector 11, pinion 12, crank 14 and push rod 15.

If the diameter of pinion 4 is twice as large as the diameter of pinion 5, we obtain the movement which is schematically represented in FIGS. 6 through 9.

Figure 9:
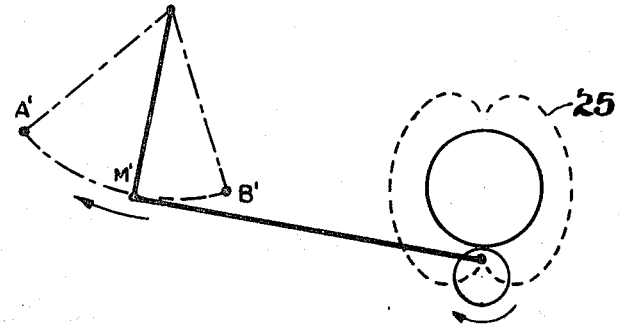

Moreover, FIG. 9 shows also the path 21 of the point of articulation of the push rod 10 on the crank pin 9. This movement depends on the radius $e$, and the speed of the platen in the positions as per FIGS. 7 and 9 is more or less reduced.

Figure 7:
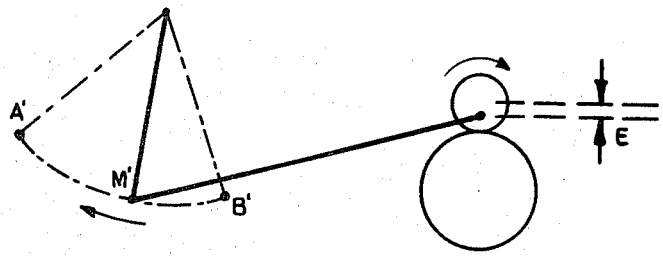
Figure 8:
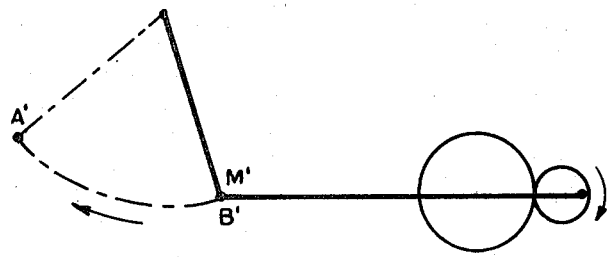

If $e$ is equal to the radius of pinion 5, the platen speed becomes zero in the positions of FIGS. 7 and 9.

FIG. 10 represents the characteristics of speed and amplitude of movement in a given machine for which the desired speed during the critical upward (FIGS. 2 and 7) and downward (FIGS. 4 and 9) motions was between 100 millimeter and 300 millimeter per second, whereas the maximum speed reached 1 meter per second.

On this graph, the curve 22 represents the speeds of platen 16 during an operating cycle, and the curve 23 shows, corresponding to a curve 22 and always as a function of time, the relative travel position of this platen 16 during the same operating cycle. Of course this invention is not limited to the variations shown and described above; other means and variations can be provided without leaving the scope of this invention.

We claim:

1. In a device for positioning of a workpiece 19 on a work station, a frame (17), a work holding and positioning platen (16), arranged so as to lift and lower a workpiece within the frame from a conveyor to the working position, a crank and rod assembly (11, 12, 13, 14, 15) for moving the said platen, a pushrod (10) one end of which is articulated to the said crank and rod assembly, a second crank and pin articulated to the other end of pushrod 10, the said second crank (9) fixed to a pinion 5 which describes a planetary motion about a second pinion (4) fixed to the frame.

2. A device in accordance with claim 1 which includes an identical second set of the claimed mechanisms including additional means for simultaneously driving both sets of mechanisms.

3. A device as in claim 1 in which the crank pin (9) describes an epicycloidal path.

4. A device as in claim 1 in which the said crank and rod assembly comprises a crank (14) articulated to one end of a push rod (15) whose other end is articulated to the platen (16), a shaft, mounted on bearings fixed to the frame (17), the said shaft being fixed to the crank at its center of rotation, a pinion (12) fixed to the said pinion (12) which is free to rotate about its center, and which is caused to rotate by the action of the aforementioned push rod (10).